United States Patent [19]

Snyder et al.

[11] Patent Number: 5,352,713

[45] Date of Patent: Oct. 4, 1994

[54] FREE RADICAL CO-POLYMERIZATION OF ACRYLATES AND VINYL ETHERS

[75] Inventors: James R. Snyder, Chicago; George D. Green, Park Ridge; John J. Krajewski, Wheeling, all of Ill.

[73] Assignee: Allied-Signal Inc., Morris Township, Morris County, N.J.

[21] Appl. No.: 862,618

[22] Filed: Apr. 1, 1992

[51] Int. Cl.$^5$ ............................................. C08F 2/50
[52] U.S. Cl. ........................................ 522/40; 522/41; 522/42; 522/43; 522/44; 522/64; 522/96; 522/103; 522/181; 522/182
[58] Field of Search .................... 522/96, 42, 64, 103, 522/40, 41, 43, 44, 181, 182

[56] References Cited

U.S. PATENT DOCUMENTS

| | | | |
|---|---|---|---|
| 4,156,035 | 5/1979 | Tsao et al. | 427/44 |
| 4,324,744 | 4/1982 | Lechtken et al. | 522/64 |
| 4,433,067 | 2/1984 | Rice et al. | 521/51 |
| 4,447,520 | 5/1984 | Henne et al. | 522/64 |
| 4,525,232 | 6/1985 | Rooney et al. | 522/96 |
| 4,749,807 | 6/1988 | Lapin et al. | 521/172 |
| 4,920,156 | 4/1990 | Koleske et al. | 522/96 |
| 4,932,750 | 6/1990 | Ansel et al. | 522/181 |
| 4,999,216 | 3/1991 | Gaske et al. | 427/44 |
| 5,045,572 | 9/1991 | Plotkin et al. | 522/103 |
| 5,055,357 | 10/1991 | Plotkin et al. | 522/103 |
| 5,106,885 | 4/1992 | Liu et al. | 522/181 |
| 5,262,449 | 11/1993 | Narayanan et al. | 522/103 |

FOREIGN PATENT DOCUMENTS

| | | |
|---|---|---|
| 0155704 | 9/1985 | European Pat. Off. . |
| 90/01243 | 9/1990 | PCT Int'l Appl. . |
| WO91/11466 | 8/1991 | PCT Int'l Appl. . |

OTHER PUBLICATIONS

James A. Dougherty and Fulvio J. Vara, "Versatility Using Vinyl Ethers in Concurrent Cationic/Free Radical Formulations" Radtech 90, North America, Conference Proceedings.

*Primary Examiner*—Susan W. Berman
*Attorney, Agent, or Firm*—Harold N. Wells; Gerhard H. Fuchs; Mary J. Boldingh

[57] ABSTRACT

A radiation curable coating composition comprising acrylate oligomers and monomers, vinyl ether monomers, and a free radical photoinitiator. The vinyl ether monomers replace N-vinyl-pyrrolidone or other undesirable reactive diluents while retaining or modifying the properties of coatings using such diluents.

13 Claims, No Drawings

FREE RADICAL CO-POLYMERIZATION OF ACRYLATES AND VINYL ETHERS

BACKGROUND OF THE INVENTION

This invention relates to the radiation curing of polymerizable coatings, such as is commercially practiced on many types of substrates. Radiation curing speeds up the application of coatings and generally requires the use of photoinitiators.

There are two principal types of such photoinitiators, cationic and free radical, which are selected depending upon the species of polymerizable materials used. For example, cationic photoinitiators are required by vinyl ethers and epoxy compounds, while free radical photoinitiators are employed with acrylates. When free radical photoinitiators are used, it is generally preferred to carry out the polymerization in an inert atmosphere such as nitrogen. Otherwise, the polymerization reaction is slowed by the presence of oxygen. Materials which are radiation cured with cationic photoinitiators need not avoid air and thus have an advantage over materials which require an inert atmosphere to be most efficiently cured.

In the past, where both types of polymerizable compounds have been used together, both types of photoinitiators have been included. For example, in U.S. Pat. No. 4,156,035 mixtures of epoxy resins and acrylates are shown to be cured by radiation in the presence of both cationic and free radical photoinitiators. Dougherty and Vara in Rad Tech 90, North America, Conference Proceedings, confirmed this and reported on their experiments with mixtures of acrylates and vinyl ethers in which they employed both types of photoinitiators. They found that the use of cationic photoinitiators alone gave inferior results compared to mixtures of both types. More importantly, they found that free radical initiators failed to provide sufficient curing when both acrylates and vinyl ethers were present.

In U.S. Pat. No. 4,999,216 the patentees reported on a formulation which employed only free radical initiators with mixtures of vinyl ethers and maleate or fumarate esters which are known in the art to copolymerize. The coating formulation was intended for use on concrete floors and, as the patentees pointed out, cationic photoinitiators could not be used on a basic substrate since they involve the release of acid compounds. The assignee of the '216 patent stated in PCT/US90/01243 that vinyl ethers do not homopolymerize in the presence of free radical initiators and that they are therefore not replacements for (meth)acrylates.

Many of the radiation cured coatings in commercial use today include acrylate compounds and these are often blended with undesirable reactive diluents, such as N-vinyl pyrrolidone and acrylate monomers. Consequently, it is important to limit the use of such undesirable compounds and the substitution of vinyl ethers has been considered. Since vinyl ethers are radiation cured in the presence of cationic photoinitiators and acrylates are cured using free radical initiators, one might expect that mixtures of both types would be preferred. The present inventors have found that mixtures of multifunctional acrylates and vinyl ethers can be satisfactorily cured by radiation using only free radical photoinitiators, as will be seen in the discussion below.

SUMMARY OF THE INVENTION

In a radiation curable coating composition comprising multifunctional acrylates, reactive diluents such as N-vinyl pyrrolidone and acrylates are replaced at least in part by vinyl ether monomers. Preferably, the vinyl ether monomers comprise up to about 35 equivalent % of the formulation particularly about 0.5 to 20 equivalent percent. The compositions are cured by the use of an effective amount of a free radical photoinitiator.

The vinyl ether monomers may be defined by the formula

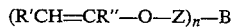

where
- R' and R" are monovalent radicals selected from the group consisting of H and alkyl groups having 1–10 carbon atoms
- Z is a divalent radical having a molecular weight of about 28 to 250 and selected from the group consisting of alkylene, cycloalkylene or polyalkylene ether radicals
- n is an integer from 1 to 4
- B is derived from aromatic and aliphatic hydrocarbons, esters, ethers, siloxanes, urethanes, and carbonates and has a molecular weight of about 60 to 400.

Acrylates may be defined generally as compounds which contain the group

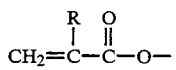

where
R is H or $CH_3$

In the present invention, multifunctional acrylates are included in the coating composition in preference to monofunctional acrylates although some monofunctional acrylates could be present. The acrylates may be oligomers and/or monomers and preferred formulations include those containing urethane and epoxy oligomers.

The free radical photoinitiators preferably are acetophenone derivatives or benzoyl diaryl phosphine oxide derivatives.

DETAILED DESCRIPTION OF THE INVENTION

VINYL ETHER MONOMERS

The vinyl ether monomers may be generally described by the formula

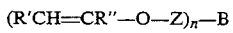

where
- R' and R" are monovalent radicals selected from the group consisting of H and alkyl groups having 1–10 carbon atoms
- Z is a divalent radical having a molecular weight of about 28 to 250 and selected from the group consisting of alkylene, cycloalkylene or polyalkylene ether radicals
- n is an integer from 1 to 4
- B is derived from aromatic and aliphatic hydrocarbons, esters, ethers, siloxanes, urethanes, and carbonates and has a molecular weight of about 60 to 400

Monofunctional monomers are those which have $n=1$, while the multifunctional monomers are those which have $n=2$ to 4.

Vinyl Ether Monomers from Esters

Vinyl ether terminated ester monomers may be described by the formula

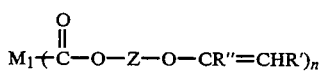

where
n is 1 to 4,
$M_1$ is a mono, di, tri, or tetra functional radical having a molecular weight of 15 to 180 and selected from the group consisting of alkylene, arylene, arakylene and cycloalkylene radicals,
Z is a divalent radical having a molecular weight of 28 to 250 and selected from the group consisting of alkylene, cycloalkylene, or polyalkylene ether radicals
R' and R" are monovalent radicals selected from the group consisting of H and alkyl groups having 1-10 carbon atoms In one preferred embodiment $M_1$ is a mono, di, tri, or tetra functional radical of benzene. In another embodiment, $M_1$ is alkylene with 2-4 carbon atoms and Z is the $\alpha,\alpha'$ diradical derived from 1,4-dimethylcyclohexane.

Vinyl Ether Monomers from Ethers

Vinyl ether terminated ether monomers may be obtained by reacting poly(ethyleneoxy), poly(propyleneoxy) or poly(butyleneoxy) glycols, i.e., HO—[—$CH_2CH_2O$]$_m$—H, HO—[—$CH(CH_3)CH_2O$]$_m$—H, or HO—[—$(CH_2)_4O$]$_m$—H, respectively, where m has an average value of about 1 to 5 with acetylene or a vinyloxyalkylhalide, for example, 2-chloroethyl vinyl ether. Transvinylation of the glycols with an alkyl vinyl ether may also be used.

Vinyl Ether Monomers From Aliphatic Hydrocarbons

Vinyl ether terminated aliphatic monomers may be described by the formula

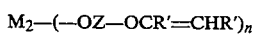

where
n is 1 to 4
$M_2$ is a mono, di, tri, or tetra functional aliphatic or cycloaliphatic radicals having a molecular weight of about 56 to 500
Z is a divalent radical as defined above
R' and R" are monovalent radicals as defined above

Vinyl Ether Monomers From Aromatic Hydrocarbons

Vinyl ether terminated aromatic monomers may be described by the formula

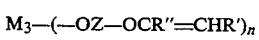

where
n is 1 to 4
$M_3$ is a mono, di, tri, or tetrafunctional aromatic radical having a molecular weight of about 77 to 500
Z is a divalent radical as defined above
R' and R" are monovalent radicals as defined above

Vinyl Ether Monomers from Polysiloxanes

Vinyl ether terminated polysiloxane monomers may be described by the formula

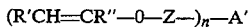

where
n is an integer from 2 to 8
A is a polysiloxane having n Si—H groups and a molecular weight of 140 to 500
R', R", and Z are as defined above.

Vinyl Ether Monomers from Urethanes

Vinyl ether terminated urethane monomers may be described by the formula

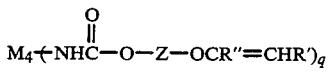

where
$M_4$ is a mono, di, or tri functional radical selected from the group consisting of alkylene, arylene, aralkylene, and cycloalkylene radicals
q is 1 to 3
R', R", Z are as defined above The monomers may also be derived from polyisocyanates, such as those described in U.S. Pat. No. 4,433,067. The term polyisocyanate also is intended to include quasi prepolymers of polyisocyanates where the polyisocyanate has been reacted with active hydrogen containing materials, such as polyols.

Vinyl Ether Monomers from Carbonates

Vinyl ether terminated carbonate monomers may be described by the formula

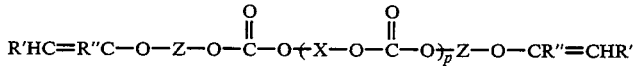

where
p is 0 to 3
Z is as defined above
X is a diester, diol, or polyol moiety

Acrylates

Acrylates may be generally defined as compounds which contain the group

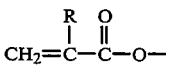

where
R is H or $CH_3$.

Typically acrylates may be oligomers and monomers and may include urethane and epoxy moieties. It has been found that monofunctional acrylates will not react adequately with vinyl ethers, as will be seen in the examples below. However, multifunctional acrylates can react with vinyl ethers until only a small amount of the monomers remain unreacted. Thus, in order that unreacted vinyl ethers may be minimized, multifunctional acrylate oligomers or monomers or both should be present, although monofunctional acrylates could be included to the extent that the end use of the composition permits. Multifunctional acrylates which have been found useful are employed in the examples below. However, other multifunctional acrylates are not excluded. Acrylates which contain acid moieties should be avoided since they may react with vinyl ethers.

Photoinitiators

Free radical photoinitiators known in the art may be used, particularly acetophenone derivatives and benzoyl diaryl phosphene oxide derivatives such as are discussed in U.S. Pat. No. 4,999,216.

One preferred photoinitiator used in the examples below is Irgacure 184, an acetophenone derivative supplied by Ciba-Geigy and having the formula

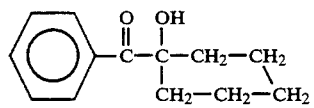

In the examples about 3 pph (parts per hundred) of the photoinitiator is typically used, but more generally an effective amount of about 3 pph ±2 pph of the composition may be employed depending on the film thickness. The selection of the photoinitiator and the degree of exposure to radiation will be determined experimentally for each formulation.

Formulation

It has been the intention of the present inventors to replace undesirable reactive diluents such as N-vinyl pyrrolidone in acrylate formulations. Since acrylates cure by a free radical mechanism, the substitution of vinyl ethers for N-vinyl pyrrolidone would be expected to be unsuccessful, since vinyl ethers are known to cure by a cationic mechanism. This is the conclusion stated by the patentees in U.S. Pat. No. 4,999,216. The present inventors have discovered that vinyl ethers may be used as reactive diluents in acrylate formulations which contain multifunctional acrylates.

In general, the amount of vinyl ethers included in the formulation will depend upon the maximum permissible unreacted vinyl ether in the cured film. Consequently, the vinyl ethers could be substituted for NVP or acrylate diluents to the extent that the particular application would accept unreacted diluents in the cured film. The maximum amount of vinyl ethers in the coating formulation may be up to about 30 equivalent %, but typically would be in the range of 0.5 to 20 equivalent %. The amount of vinyl ethers which can be included in the formulation will also be affected by the structure of the vinyl ethers used, since their reactivity will depend upon the structure. Thus, the vinyl ether monomers included in the formulas presented above will perform differently with respect to their reactivity with acrylates. One skilled in the art will understand that selection of specific vinyl ethers and the amounts used will be determined from experience with formulations with the boundaries described herein.

In Examples 1-3 which follow coating compositions were formulated using urethane-acrylate oligomers and epoxy-acrylate oligomers to demonstrate the advantages of replacing the presently used monomers with vinyl ethers. For example, replacing the monofunctional monomer N-vinyl pyrrolidine and the difunctional monomer hexanediol diacrylate with vinyl ethers. In each test the free radical photoinitiator Irgacure 184 (Ciba-Geigy) was used. All of the sample films were irradiated at 450 mJ/cm$^2$ with an RPC model QC-1202 ultraviolet processor using two medium pressure mercury arc lamps in a nitrogen atmosphere.

A group of 1.5 mil (0.038 mm) thick films were irradiated to cure and then extracted with methylene chloride in a Soxhlet extractor for 24 hours to determine the amount of unreacted monomers in the films.

Tensile testing was carried out on films coated onto glass plates with a 3 mil (0.076 mm) Byrd film applicator. The films were cured and then cut into 0.5"×3" (12.7×76.2 mm) strips which were removed from the glass plate and tested in an Instron Model 4502 tester. The modulus was measured at 1% elongation according to ASTM D882.

Studies of the cure response were carried out using DuPont DSC, Model 910 and a DuPont DPC Model 930.

The Tg (glass transition temperature) was measured on 3 mil (0.076 mm) films which had been cured at 450 mJ/cm$^2$ using a Rheovibron Model DDV-II-C at 4 Hz.

The molecular weight distributions were determined using a Perkin-Elmer apparatus with a LC-30 RI detector. Ethyl acetate was used as a solvent and samples were passed through a series of columns as follows: 5 micron/50 A, 5 micron/500 A, and 10 micron/mixed bed.

EXAMPLE 1

A series of formulations were prepared including 70 wt. % UV-893 (a urethane acrylate, Morton) and 15 wt. % of trimethylol propanetriethoxyacrylate (TMPTEA, Sartomer). The remaining 15 wt. % was N-vinyl pyrrolidine (NVP), 4-vinyl oxybutylbenzoate (HBZ), hexanediol diacrylate (HDDA), or bis(4-vinyloxybutyl)succinate (VEX-4030, Allied-Signal). Three pph of Irgacure 184 was included. The four types of films were cured as described above and then evaluated for percent extractables, viscosity, tensile strength, elongation modulus, energy at break, Tg, induction time, peak time, percent reacted at peak, and mean and average molecular weight. The four formulations were designated A,B,C, and D. Their compositions are given in the table below as weight percent and in brackets, as equivalent percent.

TABLE A

| Formulation | A | B | C | D |
|---|---|---|---|---|
| UV-893 | 70% | 70% | 70% | 70% |
|  | (32.9) | (40.9) | (33.1) | (38.8) |
| TMPTEA | 15% | 15% | 15% | 15% |
|  | (27.8) | (34.5) | (28) | (32.8) |
| NVP | 15% | — | — | — |
|  | (39.3) |  |  |  |
| HBZ | — | 15% | — | — |
|  |  | (24.6) |  |  |
| HDDA | — | — | 15% | — |
|  |  |  | (38.9) |  |
| VEX-4030 | — | — | — | 15% |
|  |  |  |  | (28.4) |

The results of experiments to determine the extractable content of the cured films, that is, the amount of monomers remaining unreacted, are shown in the following table.

TABLE B

| Formulation | % Extractables | % Monomer |
| --- | --- | --- |
| A | 3.16 | 0.16 |
| B | 3.84 | 0.84 |
| C | 3.17 | 0.17 |
| D | 3.56 | 0.56 |

The bulk of the extractables may be attributed to the photoinitiator. It can be concluded that both the acrylate diluents and the vinyl ethers have reacted with the urethane acrylate and the trifunctional TMPTEA.

Tests to evaluate the tensile strength of the cured films are given in the following table.

TABLE C

| Formulation | Visc. @ 25%, mPa·s | Tensile Strength (psi) [kPa] | Elongation % | Modulus (psi) [mPa] | Energy at Break (lb-in) [kJ] |
| --- | --- | --- | --- | --- | --- |
| A | 10,525 | 4481 [30,895] | 15.3 | 202,000 [1,393] | 2.9 [0.33] |
| B | 22,275 | 2414 [16,444] | 37.4 | 64,000 [441] | 2.7 [0.31] |
| C | 9,170 | 2591 [17,864] | 43.2 | 48,400 [334] | 2.9 [0.33] |
| D | 22,400 | 2688 [18,532] | 25.3 | 72,000 [496] | 2.7 [0.31] |

The viscosities of formulations B and D using vinyl ethers are higher than those of acrylate formulations A and C. It will be seen that tensile strength and modulus are altered when vinyl ethers are included. Thus, vinyl ethers can be used to achieve useful film properties.

The glass transition temperature (TG) for each formulation is shown in the following table.

TABLE D

| Formulation | Tg, °C. |
| --- | --- |
| A | 78 |
| B | 44 |
| C | 37 |
| D | 54 |

The cure response evaluation is reported in the following table.

TABLE E

| Formulation | Induction Time, sec. | Peak Max (sec) | Reacted at Peak, % |
| --- | --- | --- | --- |
| A | 0.9 | 2.8 | 21.9 |
| B | 0.9 | 2.8 | 20.7 |
| C | 0.8 | 2.4 | 20.8 |
| D | 0.8 | 2.4 | 19.4 |

Both vinyl ether formulations B and D and conventional monomers A and C appear to react in a similar manner, however, since the reactivity ratio of the vinyl ether is much lower than that of the acrylate, the acrylate should have a propensity to homopolymerize. If crossover to vinyl ether does occur, the growing vinyl ether radical will rapidly crossover to acrylate monomer. Thus, in the early stages of the vinyl ether/acrylate copolymerization, the polymer formed will be predominately acrylate based. In the latter stages of the polymerization, however, the acrylate becomes depleted relative to vinyl ether and formed during the latter stages of the reaction. Crossover to vinyl ether is enhanced. Conceptually, what is formed is a continuous polymer blend based upon the acrylate homopolymer formed in the beginning of the reaction and the acrylate/vinyl ether copolymers of varying composition. This is suggested by the data in the following table which shows that the amount of monomers reacted at a given time differs when vinyl ethers are present.

TABLE F

| Formulation | Time, sec. | | | |
| --- | --- | --- | --- | --- |
| | 2 | 4 | 6 | 8 |
| C | 16 | 46 | 66 | 78 |
| D | 15 | 43 | 62 | 74 |

EXAMPLE 2

A series of formulations were prepared including 55 wt. % UV-893 (a urethane acrylate, Morton) and 30 wt. % of trimethylol propanetriethoxyacrylate (TMPTEA, Sartomer). The remaining 15 wt. % was hexanediol diacrylate (HDDA), bis(4-vinyloxybutyl)succinate (VEX-4030, Allied-Signal) or hexanedioldivinylether (HDDVE). Again, 3 pph of Irgacure 184 was included. The three types of films were cured as described above and then evaluated for viscosity, tensile strength, elongation, modulus, and energy at break. The three formulations were designated E, F, and G. Their compositions are given in the table below, again as weight percent and in brackets, as equivalent percent.

TABLE G

| Formulation | E | F | G |
| --- | --- | --- | --- |
| UV-893 | 55% (21.5) | 55% (24.5) | 55% (24.1) |
| TMPTEA | 30% (46.3) | 30% (52.7) | 30% (51.9) |
| HDDA | 15% (32.2) | — | — |
| VEX-4030 | — | 15% (22.8) | — |
| HDDVE | — | — | 15% (24.0) |

Tests to evaluate the tensile strength of the cured films are given in the following table.

TABLE H

| Formulation | Visc. @ 25%, mPa·s | Tensile Strength (psi) [kPa] | Elongation % | Modulus (psi) [mPa] | Energy at Break (lb-in) [kJ] |
| --- | --- | --- | --- | --- | --- |
| E | 2,250 | 2,300 [15,857] | 27 | 65,000 [448] | 1.6 [0.18] |
| F | 4,810 | 4,000 [27,579] | 16 | 146,500 [1,010] | 2.1 [0.24] |
| G | 1,650 | 3,400 [23,442] | 12 | 132,000 [910] | 0.9 [0.10] |

EXAMPLE 3

A second set of formulations was prepared but in this case using an epoxy acrylate CN 104 (Sartomer). The compositions are summarized in the following table as before. Three pph of Irgacure 184 was included.

TABLE I

| Formulation | H | I | J | K |
| --- | --- | --- | --- | --- |
| CN104 | 70% (55.2) | 70% (63.5) | 70% (55.5) | 70% (61.5) |
| TMPTEA | 15% | 15% | 15% | 15% |

TABLE I-continued

| Formulation | H | I | J | K |
|---|---|---|---|---|
| | (18.6) | (21.3) | (18.6) | (20.6) |
| NVP | 15% | — | — | — |
| | (26.2) | | | |
| HBZ | — | 15% | — | — |
| | | (15.2) | | |
| HDDA | — | — | 15% | — |
| | | | (25.9) | |
| VEX-4030 | — | — | — | 15% |
| | | | | (17.9) |

The tests described above and reported in Example 1 were carried out on the second set of formulations and the results are shown in the tables below, which correspond to the tables above.

The results of experiments to determine the extractable content of the cured films, that is, the amount of monomers remaining unreacted, are shown in the following table.

TABLE J

| Formulation | % Extractables | % Monomer |
|---|---|---|
| E | 6.4 | 3.4 |
| F | 7.4 | 4.4 |
| G | 5.9 | 2.9 |
| H | 5.7 | 2.7 |

Again, the vinyl ethers are shown to react with the acrylates using a free radical photoinitiator.

Tests to evaluate the tensile strength of the cured films are given in the following table.

TABLE K

| Formulation | Visc. @ 25%, mPa·s | Tensile Strength (psi) [kPa] | Modulus Elongation % | (psi) [mPa] | Energy at Break (lb-in) [kJ] |
|---|---|---|---|---|---|
| H | 8,100 | 2,808 [19,360] | 1.2 | 330,445 [2,278] | 0.05 [0.0057] |
| I | 14,000 | 2,464 [14,524] | 1.6 | 294,026 [2,027] | 0.06 [0.0068] |
| J | 5,210 | 3,495 [24,097] | 2.6 | 276,248 [1,904] | 0.08 [0.009] |
| K | 11,725 | 2,570 [17,719] | 1.6 | 284,257 [1,960] | 0.07 [0.0079] |

Unlike the first example (Table C) the tensile properties with the vinyl ether compounds (I and K) are similar to those of the more conventional formulation (H and J). Thus the film's physical properties may be adjusted by proper selection of the reactive vinyl ethers.

The glass transition temperature (Tg) for each formulation is shown in the following table.

TABLE L

| Formulation | Tg, °C. |
|---|---|
| H | 114 |
| I | 73 |
| J | 70 |
| K | 78 |

The cure response evaluation is reported in the following table.

TABLE M

| Formulation | Induction Time, sec. | Peak Max (sec) | Reacted at Peak, % |
|---|---|---|---|
| H | 0.9 | 2.6 | 19.5 |
| I | 0.8 | 2.4 | 19.1 |
| J | 0.8 | 2.4 | 20.4 |
| K | 0.8 | 2.6 | 21.0 |

EXAMPLE 4

Comparative

Two formulations were prepared including 70 wt. % UV-893, 15 wt. % TMPTEA and 15 wt. % VEX-4030. For one sample (L) both a free radical photoinitiator (2 pph Irgacure 184) and a cationic photoinitiator (1 pph UVI-6990, Union Carbide) were used and for another sample (M) only the free radical photoinitiator was used, as in the examples above. The formulations were cured as described above and then evaluated for tensile strength, elongation, modulus and energy at break. The results are given in the following table.

TABLE N

| Formulation | Tensile Strength (psi) [kPa] | Elongation % | Modulus (psi) [mPa] | Energy at Break (lb-in) [kJ] |
|---|---|---|---|---|
| L | 2,110 [14,548] | 38 | 71,700 [494] | 3.3 [0.37] |
| M | 3,500 [24,131] | 30 | 19,000 [820] | 3.1 [0.35] |

It can be seen from the results that the polymers differ as a result of the difference in the type of photoinitiator. It would be expected that a homopolymer of vinyl ether was formed when a cationic photoinitiator was present (L), while this would not occur when only a free radical initiator was used according to the invention (M).

EXAMPLE 5

Comparative

Two formulations were prepared using the monofunctional acrylate, benzyl acrylate (BA) and either N-vinyl pyrrolidone (NVP, Sample N) or 4-vinyloxybutylbenzoate (HBZ, Sample O) and 3 pph Irgacure 184. The formulations were cured as described above but in this case no solid film was formed. The amount of unreacted monomers was determined by gel permeation chromatography (GPC). The results are shown in the following table.

TABLE O

| Formulation | Composition | % Monomer Unreacted |
|---|---|---|
| N | 15% equivalents NVP | 0.4% |
| | 85% equivalents BA | 2.6% |
| O | 15% equivalents HBZ | 5.2% |
| | 85% equivalents BA | 7.9% |

It can be seen that in the conventional acrylate composition N that all NVP was reacted and only 2.6% of the acrylate was unreacted. However, when the monovinyl ether (HBZ) was substituted, the amount of unreacted acrylate increased substantially and a significant quantity of the vinyl ether also was unreacted.

EXAMPLE 6

In contrast to the results of Example 5 the use of a multifunctional acrylate instead of the monofunctional acrylate (BA) gave quite different results. Varying amounts of trimethylol propanetriethoxy acrylate (TMPTEA) were mixed with bis(4-vinyloxybutyl)succinate (VEX-4030) and 3 pph Irgacure 184. Cured films (1.5 mil or 0.038 mm) were again produced as described before and extracted with methylene chloride. The results are shown in the following table.

TABLE P

| Formulation | Composition | % Monomer Extracted |
|---|---|---|
| P | 15% equivalents 4030<br>85% equivalents TMPTEA | 0.1% |
| Q | 20% equivalents 4030<br>80% equivalents TMPTEA | 2.3% |
| R | 25% equivalents 4030<br>75% equivalents TMPTEA | 6.7% |
| S | 40% equivalents 4030<br>60% equivalents TMPTEA | 7.9% |

It can be seen that the same ratio of the vinyl ether to the acrylate used in Example 5 produced in this test a much lower amount of unreacted monomers. Consequently, it may be concluded that the multifunctional acrylates permit including significantly more vinyl ether in the formulation than do monofunctional acrylates. It also may be concluded that there is an upper limit on the amount of vinyl ethers which can be included with the acrylates. Comparison of the relative amounts of reactants based on the number of reactive equivalents is believed to provide suitable comparison.

We claim:

1. A radiation curable coating composition consisting essentially of
   (a) multifunctional acrylate oligomers and monomers;
   (b) vinyl ether monomers in amounts up to 20 equivalent % of the composition;
   (c) an effective amount of a derivative of acetophenone or a benzoyl diaryl phosphene oxide as a free radical photoinitiator.

2. The coating composition of claim 1 wherein said vinyl ether monomers have the formula $$(R'CH=CR''-O-Z)_n-B$$

where

R' and R'' are monovalent radicals selected from the group consisting of H and alkyl groups having 1–10 carbon atoms Z is a divalent radical having a molecular weight of about 28 to 250 and selected from the group consisting of alkylene, cycloalkylene or polyalkylene ether radicals n is an integer from 1 to 4

B is derived from at least one member of the group consisting of aromatic and aliphatic hydrocarbons, esters, ethers, siloxanes, urethanes, and carbonates and has a molecular weight of about 60 to 400.

3. The coating composition of claim 2 wherein said vinyl ether monomers are derived from esters and having the formula $$M_1 + (C-O-Z-O-CR''=CHR')_n$$
$$\quad\quad \| \quad\quad\quad\quad\quad\quad\quad\quad\quad\quad$$
$$\quad\quad O$$

where n is 1 to 4, $M_1$ is a toono, di, tri, or tetra functional radical having a molecular weight of 15 to 180 and selected from the group consisting of alkylene, arylene, aralkylene and cycloalkylene radicals, Z, R', and R'' are as defined in claim 2.

4. The coating composition of claim 2 wherein said vinyl ether monomers are derived from ethers by reacting at least one of the group consisting of poly(ethyleneoxy), poly(propyleneoxy), or poly(butyleneoxy) glycols, where m has an average value from about 1 to about 5 with acetylene or a vinyl oxy alkyl halide.

5. The coating composition of claim 2 wherein said vinyl ether monomers are derived from aliphatic hydrocarbons described by the formula $$M_2-(-OZ-OCR''=CHR')_n$$

where n is 1 to 4

$M_2$ is a mono, di, tri, or tetra functional aliphatic or cycloaliphatic radical having a molecular weight of about 56 to 500

Z, R' and R'' are as defined in claim 2.

6. The coating composition of claim 2 wherein said vinyl ether monomers are derived from aromatic hydrocarbons described by the formula $$M_3-(-OZ-OCR''=CHR')_n$$

where n is 1 to 4

$M_3$ is a mono, di, tri, or tetrafunctional aromatic radical having a molecular weight of about 77 to 500

Z, R' and R'' are as defined in claim 2.

7. The coating composition of claim 2 wherein said vinyl ether monomers are derived from a polysiloxane defined as $$(R'CH=CR''-O-Z-)_n-A'$$

where n is an integer from 2 to 8

A is a polysiloxane having n Si—H groups and a molecular weight of 140 to 500

R', R'', and Z are as defined in claim 2.

8. The coating composition of claim 2 wherein said vinyl ether monomers are (a) derived from a urethane defined as $$M_4 + (NHC-O-Z-OCR''=CHR')_q$$
$$\quad\quad\quad \| $$
$$\quad\quad\quad O$$

where $M_4$ is a mono, di, or tri functional radical selected from the group consisting of alkylene, arylene, aralkylene and cycloalkylene radical q is 1 to 3

R', R'', Z are as defined in claim 2 or (b) a vinyl ether derived from a polyisocyanate.

9. The coating composition of claim 2 wherein said vinyl ether monomers are derived from a carbonate defined as

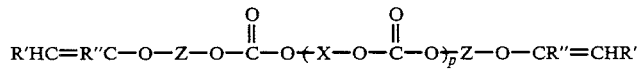

where
p is 0 to 3
Z is as defined in claim 2
X is a diester, diol, or polyol moiety.

10. The coating composition of claim 1 wherein said free radical photoinitiator is an acetophenone derivative.

11. The coating composition of claim 1 wherein the acrylate is a urethane acrylate oligomer.

12. The coating composition of claim 1 wherein the acrylate is an epoxy acrylate oligomer.

13. The coating composition of claim 1 wherein the vinyl ether monomers comprise about 0.5 to 20 equivalent percent of the composition.